United States Patent Office 2,829,158
Patented Apr. 1, 1958

2,829,158
HYDROPEROXIDES OF ALKARYL SULFONIC ACIDS AND SALTS THEREOF

Winfred E. Weldy, Wilmington, Del., assignor to Hercules Powder Company, Wilmington, Del., a corporation of Delaware No Drawing. Application February 20, 1956
Serial No. 566,363

11 Claims. (Cl. 260—502)

This invention relates to hydroperoxides and more particularly to hydroperoxides of alkaryl sulfonic acids and the salts thereof.

In accordance with the present invention, it has been found that hydroperoxides of alkaryl sulfonic acid salts are produced by contacting an alkaryl sulfonic acid salt with elementary oxygen in the liquid phase at a temperature in the range of about 50° to about 150° C.

The products of this invention are useful intermediates for the production of phenol sulfonic acids and for use as polymerization catalysts and as bactericides.

In carrying out the process in accordance with this invention, a water soluble alkaryl sulfonic acid salt is dissolved in water and the solution is then heated to a temperature in the range of about 50° to about 150° C. and brought into intimate contact with elementary oxygen as, for example, with a dispersion of air. The oxidation is carried out until a sufficient amount of hydroperoxide is formed for use in subsequent reactions or for isolation, and is preferably carried out in the presence of catalytic amounts of free-radical forming catalysts such as peroxides or hydroperoxides.

The process of this invention is applicable to alkaryl sulfonic acid salts of the general formula:

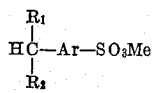

in which

constitutes an alkyl, cycloalkyl or aralkyl and $R_1$ is alkyl or taken together with $R_2$ is 1,4-alkylene or 1,5-alkylene so as to form with —CH< a cycloalkly, and $R_2$ is alkyl or aryl except when taken together with $R_1$ to form a cycloalkyl, and Ar is a divalent aromatic nucleus having a benzenoid system of unsaturation, and Me is an alkali metal or alkaline earth metal. The hydroperoxides produced have the general formula:

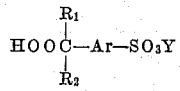

in which $R_1$, $R_2$ and Ar are the same as set forth above and Y is hydrogen or Me. Alkyl is intended to include cycloalkyl and alkaryl is intended to include cycloalkaryl. The hydroperoxides of organic sulfonic acids in which Y is hydrogen are produced by cautious acidification of the alkali or alkaline earth metal salts of the hydroperoxides of the alkaryl sulfonic acids. The acidification is preferably carried out by an acidification with an acid solution of pH less than 3 or by gradual addition of an acid of acid strength less than that of acetic acid. The alkali metal may also be substituted by hydrogen by means of ion exchange resins or by means of dialysis. The hydroperoxides of the alkaryl sulfonic acids are stable at room temperature for extended periods of time in aqueous solution.

Representative of hydroperoxides of organic sulfonic acids of this invention are: those in which $R_1$ is a methyl, ethyl, propyl, butyl, pentyl, hexyl, heptyl, octyl, nonyl, decyl, dodecyl, cyclohexyl or octadecyl or taken together with

and $R_2$,

is cyclohexyl, cyclopentyl, methylcyclopentyl or methylcyclohexyl; and $R_2$ is the same as $R_1$ or is phenyl, tolyl, naphthyl or phenanthryl; and Ar is a substituted or unsubstituted phenylene, naphthylene or phenanthrylene.

The following examples, in which all parts and percentages are by weight, are illustrative of the process in accordance with this invention.

Example 1

To a solution of 25 parts sodium salt of cumene-p-sulfonic acid in 50 parts distilled water containing 0.375 part sodium carbonate was added a dispersed stream of oxygen at the rate of about 0.14 part per minute while heating the reaction mixture at 90° C.–95° C. and agitating vigorously. During the first 3½ hours, oxygen absorption was very slow, but after the reaction mixture on analysis showed the presence of about 0.4% hydroperoxide the rate attained a satisfactory value of about 3–5% per hour. The reaction was continued for a period of 25 hours at which time the hydroperoxide analysis showed the presence of 20.4% sodium α-hydroperoxy-p-isopropylbenzene sulfonate corresponding to a conversion of 55.1%.

The aqueous hydroperoxide solution was acidified to a pH in the range of 2 to 3 by slow addition of concentrated hydrochloric acid with good agitation at a temperature of 20° C. The resulting solution analyzed 15% α-hydroperoxy-p-isopropylbenzene sulfonic acid and the hydroperoxide content did not change during a period of 30 days at room temperature.

A portion of the cumene p-sulfonic acid hydroperoxide solution was acidified with concentrated hydrochloric acid to pH 1 and heated at 95–100° on a steam bath for one hour. The resulting product gave a distinct phenol test with ferric chloride indicating cleavage of the hydroperoxide to phenol p-sulfonic acid.

Example 2

Example 1 was repeated with the sodium salt of cumene-m-sulfonic acid, sufficient sodium hydroxide being added to make an aqueous solution of the salt of pH 10.2. The oxidation was continued for 25 hours to obtain a hydroperoxide content corresponding to 55% conversion. The hydroperoxide of cumene-m-sulfonic acid was produced by acidification to pH 6.0 with 1% sulfuric acid at 0° C. The resulting solution was stable and showed by analysis no loss in hydroperoxide content during 6 days at 24° C.

Example 3

The oxidation process of Example 1 was repeated with 25 parts sodium salt of p-cyclohexyl benzene sulfonic acid in 75 parts water. The oxidation process was continued for 94.5 hours to obtain a solution containing 14.7% hydroperoxide of the sodium salt of p-cyclohexyl benzene sulfonic acid. This hydroperoxide on acidification to pH 3 gave a hydroperoxide of p-cyclohexyl benzene sulfonic acid which was stable at room temperature in aqueous solution of pH 3.

*Example 4*

The calcium salt of sulfonated β-isopropylnaphthalene on oxidation following the procedure of Example 1 gave a 25% solution of the calcium salt of β-(α-hydroperoxyisopropyl) naphthalene sulfonic acid which on acidification to pH 3 with 5% sulfuric acid gave a hydroperoxide of the free sulfonic acid which was stable in aqueous solution of 20% concentration.

*Example 5*

To a solution of 30 parts barium salt of retene sulfonic acid (sulfonated 1-methyl-7-isopropylphenanthrene) in 100 parts distilled water was added a dispersed stream of oxygen at a rate of about 0.14 part per minute while heating the reaction mixture at 100–105° C. and agitating vigorously. In order to initiate the reaction 0.2 part benzoyl peroxide was added to the reaction mixture. The oxidation was continued for 30 hours at which time analysis indicated about 20% conversion to the barium salt of 1-methyl-7-(α-hydroperoxyisopropyl) phenanthrene sulfonic acid. The resulting solution was stable for a prolonged period of time at room temperature.

*Example 6*

Barium bis-(1,1-diphenylethane-p-sulfonate) was oxidized in the process of Example 4 with substantially similar results.

The oxidation of the alkaryl sulfonic acid salts to the hydroperoxides of this invention is carried out in substantially neutral to slightly alkaline aqueous solution. The concentration is not critical and may vary from dilute solutions to saturated solutions. Dilute solutions of as low as 1% concentration are quite readily oxidized in the process of this invention.

The temperature of the oxidation reaction is in the range of about 50° to about 150° C. and is preferably in the range of about 90° to about 115° C. The higher the temperature the more rapid the oxidation.

The elementary oxygen for the process of this invention is gaseous oxygen and it may be used in the pure state or diluted with inert gas such as nitrogen. In practical operations air or air fortified with oxygen is particularly satisfactory. The oxidation may be carried out at atmospheric, subatmospheric or superatmospheric pressure. Superatmospheric pressure is particularly desirable in those cases where the oxidation temperature is above the boiling point of the solvent used in the system.

In order to prevent breakdown of the hydroperoxides during the oxidation process the oxidation system is maintained neutral or slightly on the alkaline side. The oxidation system is preferably kept at about pH 7.5 to 9.0 A neutral salt or one containing a slight excess of the hydroxide of the metal is readily oxidized. The neutral salt may be formed from the sulfonic acid and an alkali or alkaline earth metal hydroxide or carbonate. While all alkali and alkaline earth salts of the alkaryl sulfonic acids of the general formula above are oxidizable, the preferred salts are those of sodium, potassium, calcium and barium.

The oxidation is initiated by free-radical forming catalysts and is maintained by free radicals developed from the hydroperoxides in the system. Free-radical forming catalysts which are used in the process include organic and inorganic peroxides and hydroperoxides. It is preferable to use as a catalyst some of the hydroperoxide from a previous run corresponding to the hydroperoxide being oxidized. However, the process does not exclude the possibility of using other well-known peroxides or hydroperoxides as free-radical forming catalysts.

The salts of the hydroperoxides of the organic sulfonic acids of this invention are converted into the free acids by acidification with an aqueous acid solution of pH less than about 3, and the acid used in such a solution may be any of the water-soluble mineral acids such as hydrochloric acid, sulfuric acid, phosphoric acid or nitric acid or it may be a water-soluble organic acid such as formic, acetic, propionic, oxalic, glutaric, carbonic, maleic, malic or citric acids. Acidification may also be accomplished with an organic acid of acid strength less than that of acetic acid in nonaqueous solution. The free hydroperoxide of the sulfonic acid may be recovered by precipitation from nonaqueous solution by addition of a petroleum hydrocarbon and it can be recovered from aqueous solution by extraction with ether. The aqueous solution of the sodium salt may also be converted into the free hydroperoxide of the sulfonic acid by means of acid exchange resins of zeolites and can be recovered from the aqueous solution by extraction with ether. The pure hydroperoxide decomposes on removal of diluting solvents unless such removal is carried out at very low temperatures, e. g., lower than −10° C.

By the process of this invention hydroperoxides of aromatic sulfonic acid and salts thereof have been produced for the first time. These hydroperoxides are of importance as intermediates in organic syntheses. For example, they may be heated with mineral acids to form the corresponding phenol sulfonic acid and the hydroperoxides may be chemically reduced to the corresponding tertiary alcohols which in turn may be dehydrated to the corresponding isopropenylaromatic sulfonic acids. The hydroperoxides of aromatic sulfonic acids and salts of this invention are also particularly useful as polymerization catalysts and as bactericides.

What I claim and desire to protect by Letters Patent is:

1. As a new composition of matter a hydroperoxide of a material of the group consisting of organic sulfonic acids and the salts thereof of the general formula:

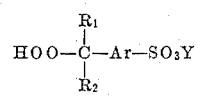

in which

constitutes a radical selected from the group consisting of alkyl, cycloalkyl and aralkyl wherein $R_1$ is a radical selected from the group consisting of alkyl and, when taken in conjunction with $R_2$, a radical of the group consisting of 1,4-alkylenes and 1,5-alkylenes and $R_2$ is selected from the group consisting of alkyl and aryl radicals, and when taken in conjunction with $R_1$, a radical of the group consisting of 1,4-alkylenes and 1,5-alkylenes, and Ar is a divalent aromatic hydrocarbon radical, and Y is selected from the group consisting of hydrogen and alkali and alkaline earth metals.

2. As a new composition of matter α-hydroperoxyisopropylbenzene sulfonic acid.

3. As a new composition of matter α-hydroperoxy-p-isopropylbenzene sulfonic acid.

4. As a new composition of matter a salt of α-hydroperoxy-p-isopropylbenzene sulfonic acid and a metal of the group consisting of alkali and alkaline earth metals.

5. As a new composition of matter an alkali metal salt of α-hydroperoxy-p-isopropylbenzene sulfonic acid.

6. As a new composition of matter sodium α-hydroperoxy-p-isopropylbenzene sulfonate.

7. As a new composition of matter sodium α-hydroperoxy-m-isopropylbenzene sulfonate.

8. The method for the production of a hydroperoxide of a salt of an organic sulfonic acid of the general formula:

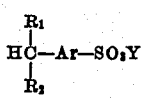

in which

constitutes a radical selected from the group consisting of alkyl, cycloalkyl and aralkyl wherein $R_1$ is a radical selected from the group consisting of alkyl, and when taken in conjunction with $R_2$, a radical of the group consisting of 1,4-alkylenes and 1,5-alkylenes and $R_2$ is selected from the group consisting of alkyl and aryl radicals and, when taken in conjunction with $R_1$, a radical of the group consisting of 1,4-alkylenes and 1,5-alkylenes, and Ar is a divalent aromatic hydrocarbon radical, and Y is selected from the group consisting of alkali and alkaline earth metals, which comprises contacting a compound of said formula in nonacidic aqueous solution with elementary gaseous oxygen at a temperature in the range of about 50° to about 150° C.

9. The method for the production of a hydroperoxide of an isopropylbenzene sulfonic acid salt which comprises contacting an isopropylbenzene sulfonic acid salt of a metal of the group consisting of alkali and alkaline earth metals in nonacidic aqueous solution with elementary gaseous oxygen at a temperature in the range of about 50° to about 150° C.

10. The method for the production of a hydroperoxide of sodium p-isopropylbenzene sulfonate which comprises contacting sodium p-isopropylbenzene sulfonate in nonacidic aqueous solution with elementary oxygen at a temperature in the range of about 50° to about 150° C.

11. The method for the production of a hydroperoxide of the sodium salt of p-isopropylbenzene sulfonic acid which comprises contacting the sodium salt of p-isopropylbenzene sulfonic acid in aqueous solution of pH 7.5–9 with elementary gaseous oxygen at a temperature in the range of about 50° to about 150° C.

References Cited in the file of this patent

UNITED STATES PATENTS

| | | |
|---|---|---|
| 2,524,084 | Rust et al. | Oct. 3, 1950 |
| 2,687,438 | Lorand et al. | Aug. 24, 1954 |
| 2,718,530 | Conner | Sept. 20, 1955 |
| 2,719,864 | Conner | Oct. 4, 1955 |
| 2,799,695 | Taves | July 16, 1957 |
| 2,799,715 | Lohr et al. | July 16, 1957 |